No. 754,981. PATENTED MAR. 22, 1904.
W. C. EBERHARDT.
METALLIC ROD PACKING.
APPLICATION FILED AUG. 7, 1903.
NO MODEL.

Witnesses
H. S. Austin
H. C. Martin

Inventor
William C. Eberhardt
By Julian C. Dowell & Son
his Attorneys.

No. 754,981. Patented March 22, 1904.

UNITED STATES PATENT OFFICE.

WILLIAM C. EBERHARDT, OF SAYRE, PENNSYLVANIA.

METALLIC ROD-PACKING.

SPECIFICATION forming part of Letters Patent No. 754,981, dated March 22, 1904.

Application filed August 7, 1903. Serial No. 168,679. (No model.)

*To all whom it may concern:*

Be it known that I, WILLIAM C. EBERHARDT, a citizen of the United States, residing at Sayre, in the county of Bradford and State of Pennsylvania, have invented certain new and useful Improvements in Metallic Rod-Packing; and I do hereby declare the following to be a full, clear, and exact description of the invention, such as will enable others skilled in the art to which it appertains to make and use the same.

This invention relates to metallic packing devices for piston-rods, valve-stems, and the like, and especially for locomotive throttle-rods or any rods which are not in exact alinement with the glands of their stuffing-boxes or where there is perceptible lateral movement or vibration.

The principal objects of the invention are to provide an improved rod-packing construction whereby a permanent and effective steam-tight joint may be maintained under all conditions regardless of vibration or lateral play of the rod, and, further, to provide for thorough lubrication of the rod and packing by introduction of oil from a suitable oil cup or reservoir without liability of the oil being blown out or scattered by steam.

The invention will first be described with reference to the accompanying drawings, which are to be taken as a part of this specification, and its distinguishing features will then be pointed out in the claims following the description.

Figure 1:
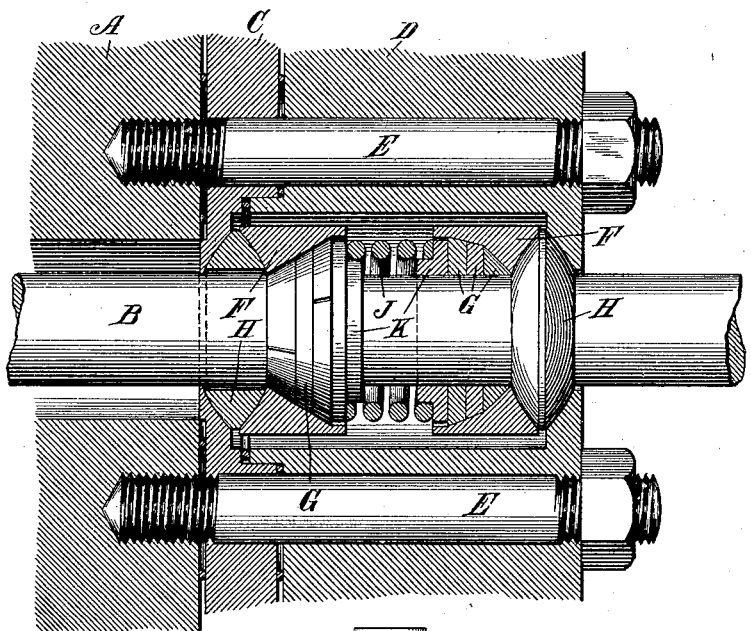
Figure 2:
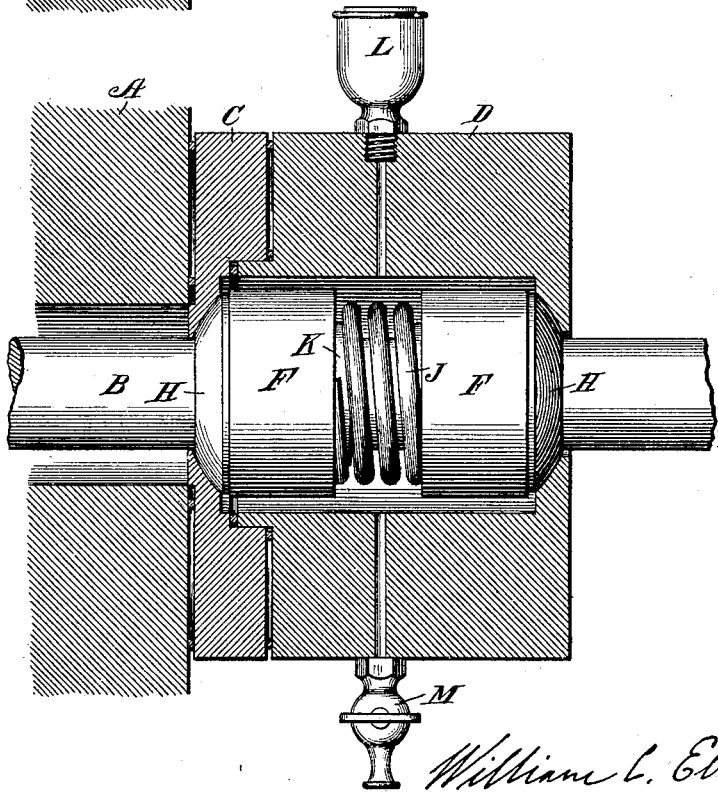

In said drawings, wherein corresponding parts in the several figures are indicated by the same letters of reference, Figure 1 is a horizontal section, and Fig. 2 a longitudinal vertical section, of a rod-packing device embodying my invention, in each view the rod and parts of the packing devices appearing in elevation.

The letter A in the drawings may denote a portion of a boiler head or shell or cylinder-head or steam-turret, and B a throttle-rod or piston-rod or valve-stem. The said head or turret may be formed or provided with any ordinary stuffing-box around the opening for the rod, in which the packing devices may be retained by an ordinary gland or follower; but for the purpose of more readily applying the invention to all forms of boilers and engines, as well as for greater convenience in assembling the packing devices, I have provided a two-part gland, (indicated in the drawings by the letters C and D.) The two parts or members of this gland may be secured together and to the boiler-head or turret by stud-bolts E and fastening-nuts in the usual manner, and one or both members may be centrally chambered around the rod to contain the packing devices, thus taking the place of a stuffing-box or constituting, in effect, a composite stuffing-box and gland. In the present construction the gland member C is in the form of a plate and located between the thicker chambered member D and the boiler-head, one member also having an annular projection fitting telescopically within an annular rabbet or recess in the other to produce a better joint and facilitate assembling them in proper relation. Steam-tight joints may be formed between the boiler-head and members C, as well as between the members C and D, by means of copper rings or gaskets interposed at suitable places, as illustrated.

The metallic packing devices are contained within the central chamber of the gland and are compressed or retained between the opposite apertured flanges of the two gland members through which the rod passes. Said packing devices consist, preferably, of the following: two oppositely-disposed vibrator-cups F, interiorly tapered or conical and each inclosing a conical ring or, preferably, a series of tapered split metallic packing-rings G, two metallic rings H, interposed between the vibrator-cups and the said flanges of the gland members, said rings having opposite convex or spherical surfaces fitting in corresponding spherically-concave surfaces in the said flanges, and a strong spring or springs acting oppositely against the two sets of devices, forcing the packing-rings tightly into their cups and around the rod, spreading the cups apart and tightly squeezing the double-convex rings between said cups and the flanges of the gland members. A stout coiled compression-spring J is here shown fitted between supporting-rings or collars K, which bear squarely against the innermost or adjacent packing-rings. As the packing-rings wear the pressure of the spring pushes them farther into their cups, causing them to hug the rod with perfect contact at all times. The rings H, having their opposite convex or spherical faces fitting in corresponding surfaces in the gland members, act as "knuckles" for the vibrator-cups and by reason of such surfaces permit vibration or lateral play of the rod without leakage of steam, keeping the packing-rings in perfect alinement with the rod while allowing perfect compensation and maintaining perfectly steam-tight joints between the cups and gland members under all conditions.

By employing two oppositely-spring-pressed sets of packing devices not only is a perfectly steam-tight packing attained, but also an inclosed space is provided between the vibrator-cups free from steam-pressure for the reception of oil or tallow for lubrication of the packing-rings. The oil may be supplied from an oil-cup, such as L, mounted on the upper side of the gland between the vibrator-cups and having a suitable duct leading into the chamber, and, if desired, the entire space may be kept filled with oil, thus preserving the packing-rings and devices in an oil-bath. This feature of the invention is especially valuable in connection with throttle-rods, for in ordinary throttle-rod-packing constructions the rod is lubricated only from a swab-cup in front of the gland, and inasmuch as the throttle-rod moves only a slight distance and the packing-rings are usually located more than this distance from the swab-cup it is evident that the rings can receive but little oil, so that the packing consequently cuts and leaks.

At the bottom of the gland a relief-valve or drip-cock M may be located to relieve the oil-chamber from water which may by any possibility accumulate from condensed steam leaking through the innermost set of devices before filling the chamber of the gland with oil.

In some instances I may dispense with one set of packing devices and employ a single vibrator-cup, set of packing-rings, and knuckle-ring, applied to the rod either in a gland of the type illustrated or in an ordinary stuffing-box, with a spring interposed between the packing-rings and, for instance, the boiler-head, though I preferably employ the two sets of devices for the reasons stated. The knuckle-ring, with its two opposite convex surfaces fitting correspondingly concave surfaces in the gland members, is an exceedingly valuable feature of my invention, and the use of two of such rings in connection with the two sets of packing devices is also of great importance, producing a practically steam-tight packing. The construction is applicable to any piston-rod or the like, but is especially beneficial when applied to locomotive throttle-rods, where the gland is located in the engine-cab directly in front of the engineer, and consequently it is desirable that there be not the least leakage of steam or water.

Having thus fully described my invention, what I claim as new, and desire to secure by Letters Patent of the United States, is—

1. In a rod-packing, the combination with a suitable chamber and gland, through which the rod passes, of a vibrator-cup having an interior tapered bore, a split metallic tapered packing ring or rings within said cup, spring means forcing said rings into said cup and the latter toward one end of the chamber, and a knuckle-ring interposed between the vibrator-cup and said end of the chamber, said knuckle-ring having opposite convex surfaces and the cup and said end of the chamber having corresponding concave surfaces in contact therewith.

2. In a rod-packing, the combination of an outwardly-pressed member inclosing the rod, and means for preserving a steam-tight connection between the rod and said member, of a gland, and an interposed knuckle-ring between said gland and member having opposite convex surfaces fitting corresponding concave surfaces in said gland and member.

3. In a rod-packing, the combination with a suitable chamber and gland, through which the rod passes, of two oppositely-spring-pressed members inclosing the rod, means for preserving steam-tight connections between the rod and said members, and knuckle-rings interposed between said members and the inner end of said chamber and gland, said rings having opposite convex surfaces contacting with corresponding concave surfaces in the inner end of said chamber, said gland and said members.

4. In a rod-packing, the combination with a suitable chamber and gland, through which the rod passes, of two oppositely-disposed vibrator-cups having interior conical bores, split metallic tapered packing-rings within said cups, spring means forcing said rings into said cups and forcing the latter apart, and knuckle-rings having opposite convex surfaces interposed between said cups and the inner end of said chamber and gland, the latter having corresponding concave surfaces in contact with said knuckle-rings.

5. In a rod-packing, the combination with a steam-chest or the like having an opening for the rod, of a two-part gland having openings for the rod and chambered around the rod to contain the packing devices, means for securing the parts of said gland together to the steam-chest, and two oppositely-spring-pressed sets of packing devices inclosed within said gland, forming steam-tight connections between the rod and said gland members.

6. In a rod-packing, the combination with a steam-chest or the like having an opening for the rod, of a two-part gland having openings for the rod and chambered around the rod to contain the packing devices, means for securing the gland members together to the steam-chest, two oppositely-disposed vibrator-cups inclosing packing-rings contained within the gland, means forcing said packing-rings into said cups and closely around the rod and forcing said cups apart, and knuckle-rings interposed and ball-seated between said cups and gland members.

7. In a rod-packing, the combination with a stationary part through which the rod passes, of a member inclosing said rod spring-pressed toward said part, means for preserving a steam-tight connection between the rod and said member, and a knuckle-ring having opposite convex surfaces interposed between said member and part, the latter having corresponding concave surfaces coacting with said convex surfaces.

8. In a rod-packing, the combination with a suitable chamber and gland, through which the rod passes, of oppositely-spring-pressed packing devices in said chamber forming steam-tight joints between the rod and inner end of the chamber and gland, and an oil-cup having a duct communicating with said chamber between said devices.

In testimony whereof I affix my signature in presence of two witnesses.

WILLIAM C. EBERHARDT.

Witnesses:
F. K. STEPHENS,
H. H. MERCEREAU.